US012617089B2

(12) United States Patent
Ikeguchi

(10) Patent No.: US 12,617,089 B2
(45) Date of Patent: May 5, 2026

(54) TEACHING PROGRAM GENERATION DEVICE

(71) Applicant: DAIHEN Corporation, Osaka (JP)

(72) Inventor: Makoto Ikeguchi, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 168 days.

(21) Appl. No.: 18/492,861

(22) Filed: Oct. 24, 2023

(65) Prior Publication Data

US 2024/0399573 A1 Dec. 5, 2024

(30) Foreign Application Priority Data

May 31, 2023 (JP) ................................. 2023-090246

(51) Int. Cl.
*B25J 9/16* (2006.01)
(52) U.S. Cl.
CPC ........... *B25J 9/1664* (2013.01); *B25J 9/1605* (2013.01); *B25J 9/1671* (2013.01)
(58) Field of Classification Search
CPC ...... B25J 9/1664; B25J 9/1605; B25J 9/1671; B25J 9/1666; B25J 9/1697; B25J 9/1656; B25J 9/161; B25J 9/0081; B25J 9/1661; B25J 9/1602; B25J 9/1689; B25J 13/06; G05B 2219/36401; G05B 2219/36433; G05B 2219/39137; G05B 2219/40562
See application file for complete search history.

(56) References Cited

U.S. PATENT DOCUMENTS

| | | | | |
|---|---|---|---|---|
| 5,225,982 A | * | 7/1993 | Ito | B60K 28/16 701/91 |
| 12,275,147 B2 | * | 4/2025 | Kitagawa | B25J 9/1671 |
| 2011/0238215 A1 | * | 9/2011 | Yanagawa | G05B 19/42 901/3 |
| 2015/0314438 A1 | * | 11/2015 | Namba | G05B 19/0426 901/3 |

(Continued)

FOREIGN PATENT DOCUMENTS

| | | |
|---|---|---|
| CN | 105269572 A | 1/2016 |
| CN | 111508066 | 8/2020 |

(Continued)

OTHER PUBLICATIONS

CN101945740.translate (Year: 2011).*

(Continued)

*Primary Examiner* — B M M Hannan
(74) *Attorney, Agent, or Firm* — Sterne, Kessler, Goldstein & Fox P.L.L.C.

(57) ABSTRACT
To generate a correct path for a robot to perform a certain action while avoiding interference. The teaching program generation device generates a teaching program for teaching a robot a predetermined action, based on information about the robot and its surroundings. The device includes an acquisition unit that acquires, from a robot controller that controls driving of the robot, information to be used for the robot to perform the predetermined action while avoiding interference, and a teaching program generation unit that generates a movement path for the robot to perform the predetermined action while avoiding interference, based on the information.

3 Claims, 4 Drawing Sheets

(56)          References Cited

U.S. PATENT DOCUMENTS

| | | | |
|---|---|---|---|
| 2015/0375391 A1 | 12/2015 | Maeda | |
| 2018/0236657 A1* | 8/2018 | Kuwahara | B25J 9/1671 |
| 2018/0236675 A1 | 8/2018 | Westerhof et al. | |
| 2020/0061820 A1* | 2/2020 | McDaniel | B25J 9/1671 |
| 2020/0130095 A1* | 4/2020 | Baba | B23K 9/127 |
| 2021/0060792 A1* | 3/2021 | Yoshida | B23K 9/0956 |
| 2021/0170591 A1* | 6/2021 | Kurihara | B25J 9/1656 |
| 2021/0213606 A1* | 7/2021 | Suzumura | B25J 13/089 |
| 2022/0197306 A1* | 6/2022 | Cella | G05D 1/0297 |
| 2023/0049370 A1* | 2/2023 | Fukuda | E02F 9/2235 |
| 2023/0098696 A1 | 3/2023 | Nakagawa | |
| 2023/0147777 A1 | 5/2023 | Ikeguchi | |
| 2023/0249341 A1* | 8/2023 | Kurashima | B25J 9/163 |
| | | | 700/253 |
| 2023/0264352 A1 | 8/2023 | Yamazaki | |
| 2024/0001543 A1* | 1/2024 | Niimura | G05B 19/409 |
| 2024/0123606 A1* | 4/2024 | Utsumi | G05B 19/42 |
| 2024/0123607 A1* | 4/2024 | Iwatake | B25J 17/00 |
| 2024/0331575 A1* | 10/2024 | Hirayama | B25J 9/1687 |
| 2025/0033208 A1* | 1/2025 | Shimizu | B25J 9/1656 |

FOREIGN PATENT DOCUMENTS

| | | |
|---|---|---|
| CN | 116096536 A | 5/2023 |
| JP | 2012-135858 A | 7/2012 |
| JP | 2021-065939 A | 4/2021 |
| JP | 2023-069253 | 5/2023 |
| TW | 202313283 A | 4/2023 |
| WO | WO 2019/046559 | 3/2019 |
| WO | WO 2021132107 | 7/2021 |
| WO | WO 2021/261411 | 12/2021 |

OTHER PUBLICATIONS

CN102189315-translate (Year: 2011).*
CN104175031.translate (Year: 2014).*
CN110505934.translate (Year: 2019).*
JP2007122705.translate (Year: 2007).*

\* cited by examiner

TEACHING PROGRAM GENERATION DEVICE

BACKGROUND

Field

The present invention relates to a teaching program generation device.

Description of Related Art

In the field of factory automation, processing is performed to prepare, in advance, programs that describe the content of a specific action for a robot to execute. This process is known as teaching. The robot moves and repeats the specified action in accordance with the program prepared in advance through teaching. Patent Publication JP-A-2021-65939, for example, describes a method that generates a path for a robot to move while avoiding obstacles.

SUMMARY

In the conventional process of teaching, the information about a tool attached to a robot (e.g., information about one of the shape, size, and inertia of the tool) is not used as information for generating a path for the robot, to which the tool is attached, to perform a specific action while avoiding interference. Therefore, when the tool on the robot is replaced with another tool, it is impossible to take the shape, size, or inertia of the tool, which differ from tool to tool, into consideration and generate a path for the robot to perform a specific action while avoiding interference.

Moreover, in the conventional teaching, accurate information of the initial orientation or initial position of the robot when the robot starts a specific action is not used as information for generating a path for the robot to perform the predetermined action while avoiding interference. Therefore, it is not possible to take into consideration the accurate information of the initial orientation or initial position of the robot when generating a path for the robot to perform the specified action while avoiding interference.

In another conventional method of creating a teaching program, an image of the robot and objects present in the surrounding environment is captured, the distances between the robot and the objects present in the surrounding environment are measured, the positional relationships between the robot and the objects present in the surrounding environment are calculated based on the captured image and measured distances, and based on the calculation results, the teaching program for teaching the robot to implement an action is created. In this method, the operator has to input initial setting values (for example, initial position or initial orientation of the robot when starting an action thereof, or the type of the tool attached to the robot). This meant that, if the position or orientation of the robot has changed or the tool has been replaced at the start of creation of a teaching program for teaching the robot a predetermined action, the initial setting values or information input by the operator are not necessarily accurate.

Accordingly, it is an object of the invention to solve this problem and to allow for generation of a correct path for a robot to perform a certain action while avoiding interference.

To achieve the above object, the teaching program generation device according to the present invention, which generates a teaching program for teaching a robot a predetermined action based on information about the robot and surroundings thereof, includes: an acquisition unit that acquires, from a robot controller that controls driving of the robot, information to be used for the robot to perform the predetermined action while avoiding interference; and a teaching program generation unit that generates a movement path for the robot to perform the predetermined action while avoiding interference, based on the information. By acquiring the information to be used for the robot to perform a predetermined action while avoiding interference from a robot controller, it is possible to generate a correct path for the robot to perform a certain action while avoiding interference. The information about the robot and its surroundings may be, for example, images of the robot and its surroundings, or may be point cloud data of the robot and its surroundings.

The information acquired from the robot controller may include, for example, information about any of the shape, size, and inertia of a tool replaceably attached to the robot. With such information, it is possible to take into consideration the shape, size, or inertia of the tool, which differ from tool to tool, in generating a path for the robot to perform a specific action while avoiding interference, when the tool on the robot is replaced with another.

The information acquired from the robot controller may include, for example, information about the orientation or position of the robot when the robot starts the predetermined action. With such information, it is possible to take into consideration the accurate information of the initial orientation or position of the robot when the robot starts the specified action in generating a path for the robot to perform the action while avoiding interference.

The information acquired from the robot controller may include, for example, information indicating the type of the robot. With such information, the teaching program generation device can recognize the correct type of the robot when the robot as the teaching target is replaced with another.

The information acquired from the robot controller may include, for example, information indicating the type of the robot, and information indicating the type of the tool replaceably attached to the robot. The teaching program generation device may further include a memory unit that stores respective three-dimensional models of multiple types of robots, and respective three-dimensional models of multiple types of tools that can be replaceably attached to the multiple types of robots, and a display unit that reads out from the memory unit a three-dimensional model of the robot corresponding to the type of the robot, and a three-dimensional model of the tool corresponding to the type of the tool, and displays the three-dimensional model of the robot and the three-dimensional model of the tool that have been read out. When the robot or the tool is replaced with another, the operator can visually recognize that the robot or tool has been replaced, by the display of a three-dimensional model corresponding to the type of the robot or the tool after the replacement.

The present invention allows for generation of a correct path for a robot to perform a certain action while avoiding interference.

DETAILED DESCRIPTION

Figure 1:
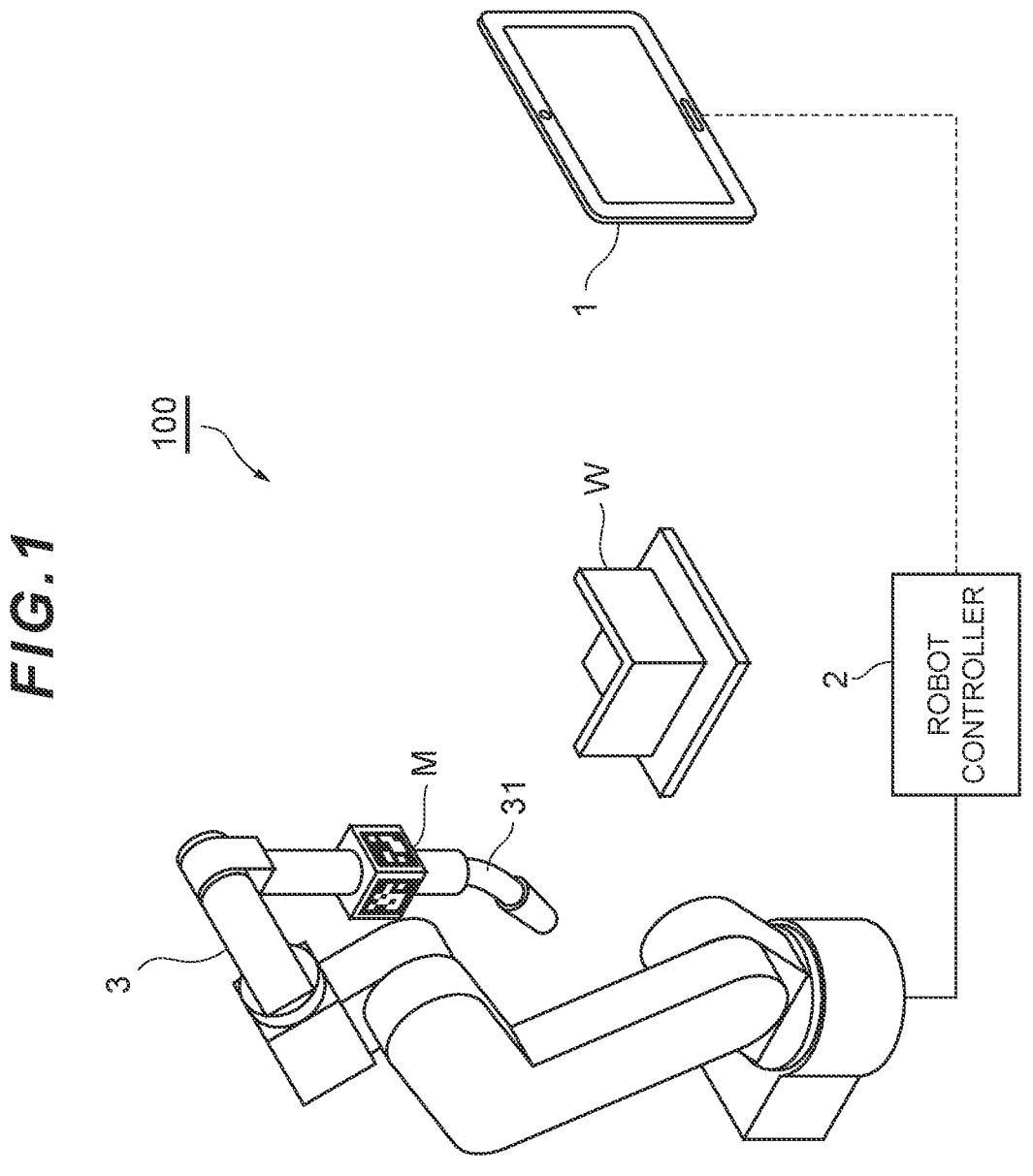
FIG. 1 is a diagram illustrating a configuration of a robot system according to one embodiment of the present invention.

Hereinafter an embodiment of the present invention will be described with reference to the drawings. The same components are given the same reference numerals and repetitive description will be omitted.

FIG. 1 shows a configuration of a robot system 100 according to one embodiment of the present invention. The robot system 100 includes a terminal device 1, a robot controller 2, and a robot (manipulator) 3, for example. The terminal device 1 and robot controller 2, and the robot controller 2 and robot 3, are connected to each other via a network. The terminal device 1 and robot controller 2 are connected by wireless communication such as WiFi (Wireless Fidelity), for example, while the robot controller 2 and robot 3 are connected via a communication cable, for example. The network can be a wired network (including a communication cable), or a wireless network.

The robot 3 has an articulated arm mounted on a base member that is fixed on a floor or elsewhere in a factory, and a tool 31 attached to the distal end of the articulated arm. The tool 31 can be replaceably attached to the robot 3. The tool 31 can be a welding torch, for example, so that the robot 3 can perform arc welding to a workpiece W that is the welding target in accordance with the commands from the robot controller 2. Alternatively, the tool 31 can be an end effector, for example, so that the robot 3 can move the workpiece W that it is holding as instructed by the commands from the robot controller 2. One tool, which is any tool selected from multiple types, can be mounted to the robot 3.

A marker M is attached to the robot 3. The marker M, which is for example an AR marker, is an identifier that allows the terminal device 1 to recognize its presence in the workspace. Recognizing an AR marker present within the workspace, the terminal device 1 can readily display a user coordinate system in registration with real-world imagery, using this AR marker as the point of origin.

Figure 2:
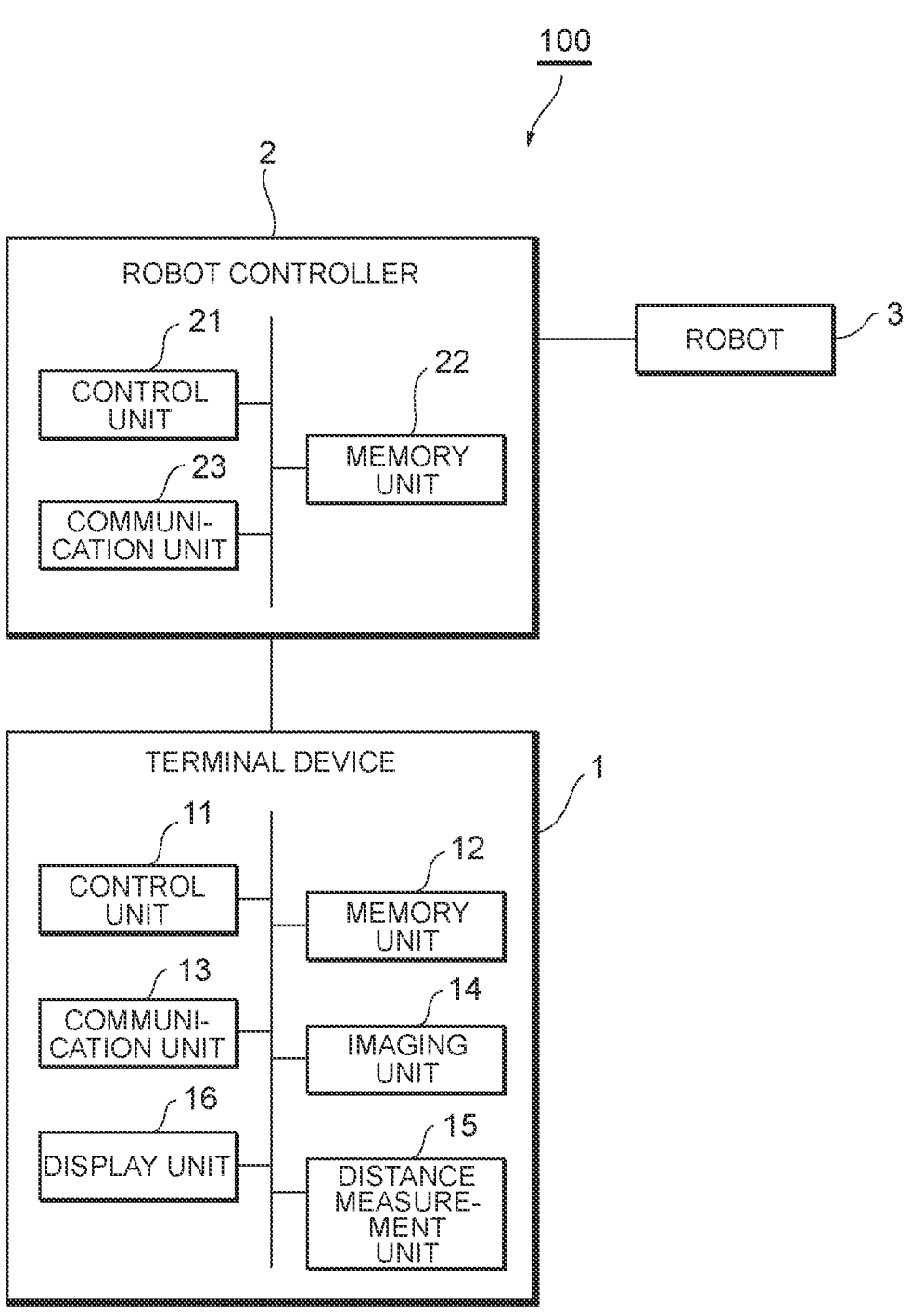
FIG. 2 is a diagram illustrating a configuration of a robot controller according to the embodiment of the present invention.

As shown in FIG. 2, the robot controller 2 is a control unit for controlling the drive of the robot 3. The robot controller 2 includes a control unit 21, a memory unit 22, and a communication unit 23, for example.

The control unit 21 is a processor, which executes a program or the like stored in the memory unit 22 to control the robot 3.

The communication unit 23 is a communication interface and controls the communication with the terminal device 1 or robot 3 that are connected via a network.

The terminal device 1 serves as a teaching program generation device that generates a teaching program for teaching the robot 3 a predetermined action. The terminal device 1 may be a portable terminal with a digital camera, for example. Portable terminals include any terminals that can be carried around, for example, such as a tablet terminal, smartphone, personal digital assistant (PDA), notebook PC (personal computer), and so on.

The terminal device 1 includes a control unit 11, a memory unit 12, a communication unit 13, an imaging unit 14, a distance measurement unit 15, and a display unit 16, for example.

The control unit 11 is a processor, which executes a program stored in the memory unit 12 to control various units of the terminal device 1.

The memory unit 12 is a computer-readable recording medium, which stores programs for implementing various functions of the terminal device 1 and various sets of data used in these programs. The data stored in the memory unit 12 includes, for example, respective three-dimensional models of multiple types of robots 3, and respective three-dimensional models of multiple types of tools 31 that can be replaceably attached to the robot 3.

The communication unit 13 is a communication interface and controls the communication with the robot controller 2 that is connected via a network.

The imaging unit 14 is a 2D camera including a lens and an image sensor (imager), for example, which converts the light from an object received through the lens into an electrical signal (digital image data). The imaging unit 14 captures an image of the robot and its surroundings in response to an instruction from the operator.

The distance measurement unit 15 is a 3D camera equipped with a distance measuring sensor, for example. The distance measuring sensor is a sensor capable of measuring the distance to an object. For example, LiDar (Light Detection and Ranging) sensors, millimeter wave sensors, ultrasonic sensors or the like can be used as the distance measuring sensor. LIDAR collects three-dimensional information of objects present in the surroundings as point cloud data. The point cloud data has a data format in which each of the pulses reflected from objects in the surroundings and detected by the LiDAR is represented as a point. The distance measuring sensor collects point cloud data of the robot and its surroundings in response to an instruction from the operator.

The display unit 16 is a display with a touchscreen, for example, which displays images of objects captured by the imaging unit 14, and receives inputs from the operator such as operation instructions.

Figure 3:
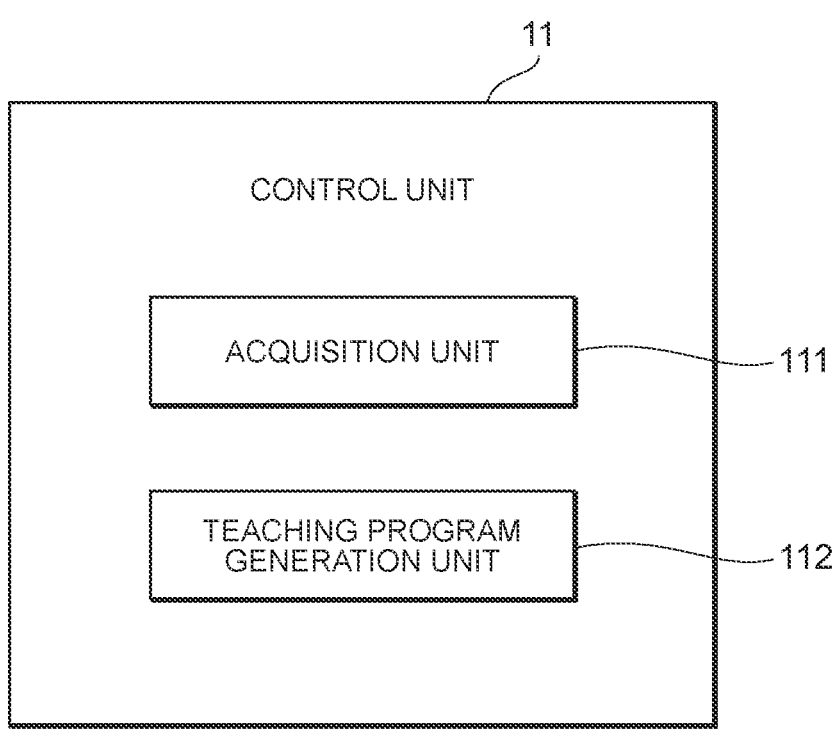
FIG. 3 is a functional block diagram of a control unit in a terminal device according to the embodiment of the present invention.

FIG. 3 shows a functional block diagram of the control unit 11 of the terminal device 1. The functions as the acquisition unit 111 and teaching program generation unit 112 are implemented by the control unit 11 executing a program stored in the memory unit 12.

The acquisition unit 111 acquires the following information (a) to (d) from the robot controller 2, which are used for the robot 3 to perform a predetermined action while avoiding interference.

(a) Information indicating the type of the robot 3, (b) Information indicating the type of the tool 31 replaceably attached to the robot 3, (c) Information about one of the shape, size, and inertia of the tool 31 that is replaceably attached to the robot 3, and (d) Information about the orientation or position of the robot 3 when the robot 3 starts a predetermined action.

The information (d) can be output values of encoders that are attached to the articulated arm of the robot 3 to detect respective angles of the joints.

In addition to the information (a) to (d) listed above, the program version information stored in the memory unit 22 of the robot controller 2 may also be used for the robot 3 to perform the predetermined action while avoiding interference.

The teaching program generation unit 112 establishes a three-dimensional user coordinate system based on the marker M included in the image captured by the imaging unit 14. Images taken by the imaging unit 14 include the robot 3 and a workpiece W that are present in the space in which the robot 3 operates, for example, as shown in FIG. 1. The marker M is attached to the distal end of the robot 3. The teaching program generation unit 112 establishes the three-dimensional user coordinate system, using a specific position of the marker M (e.g., a corner or the center of the marker) as the point of origin.

The point of origin of the user coordinate system is not limited to a specific position of the marker M, and may be the point of origin of a robot coordinate system that is defined on the basis of a specific position of the marker M. For example, by setting the marker M at a fixed position relative to the robot 3, the specific position of the marker M can be specified in the robot coordinate system, which in turn allows the point of origin of the robot coordinate system to be specified, based on the specific position of the marker M. The user coordinate system in this case is the robot coordinate system.

The teaching program generation unit 112 assigns coordinates of the user coordinate system to the point cloud data obtained by the distance measurement unit 15 that measures the distances to objects included in the image captured by the imaging unit 14. For example, the teaching program generation unit 112 detects a specific position of the marker M based on the image captured by the imaging unit 14, and sets the detected specific position of the marker on the point cloud data obtained by the distance measurement unit 15. The teaching program generation unit 112 assigns coordinates of the user coordinate system to the point cloud data, using the specific position of the marker set on the point cloud data as the point of origin (reference) of the user coordinate system. Thus the point cloud data is registered to the user coordinate system. The specific position of the marker to be set on the point cloud data may be automatically identified by data analysis, for example, or may be designated by the operator indicating it on the point cloud data.

The teaching program generation unit 112 reads out a three-dimensional model of the robot 3 corresponding to its type, and a three-dimensional model of the tool 31 corresponding to its type, from the memory unit 12. Using the read-out three-dimensional models of the robot 3 and the tool 31, the teaching program generation unit 112 computes a robot region in the user coordinate system corresponding to the robot 3 and tool 31 based on the information (a) to (d) listed above. The robot region is a virtual three-dimensional region taken up by the robot 3 and tool 31 in the user coordinate system.

The initial orientation or position of the robot 3 when the robot 3 starts a predetermined action may be the orientation or position of the robot 3 when the imaging unit 14 captured the image, for example.

The teaching program generation unit 112 generates a movement path for the robot 3 to perform a predetermined action without the robot region interfering with the point cloud data of objects that are present in the surroundings. Interference herein refers to obstruction of normal movement of the robot 3 due to physical contact between the robot 3 or tool 31 and an object present in the surroundings.

Once the path is generated for the robot 3 to move without the robot region interfering with the point cloud data of objects present in the surroundings, the teaching program generation unit 112 converts the movement path of the robot

3 in the user coordinate system into a movement path of the robot 3 in the robot coordinate system, and generates a teaching program to teach the robot 3 the predetermined action.

The display unit 16 of the terminal device 1 displays the three-dimensional model of the robot 3 corresponding to its type, and the three-dimensional model of the tool 31 corresponding to its type. The movement of these three-dimensional models enables the operator to know what paths the robot 3 and tool 31 will follow and how they move and avoid interference, without actually driving the robot 3 and tool 31.

The display unit 16 of the terminal device 1 may change the graphical user interface that allows inputs of operation instructions from the operator to make the robot 3 execute the predetermined action in accordance with the information (a) or (b) mentioned above. For example, when a welding torch is used as the tool 31, the display unit 16 may display a graphical user interface for accepting an input of instruction from the operator specifying a point to be welded on the workpiece W. When an end effector is used as the tool 31, the display unit 16 may display a graphical user interface for accepting an input of instruction from the operator specifying a holding point of the workpiece W.

Figure 4:
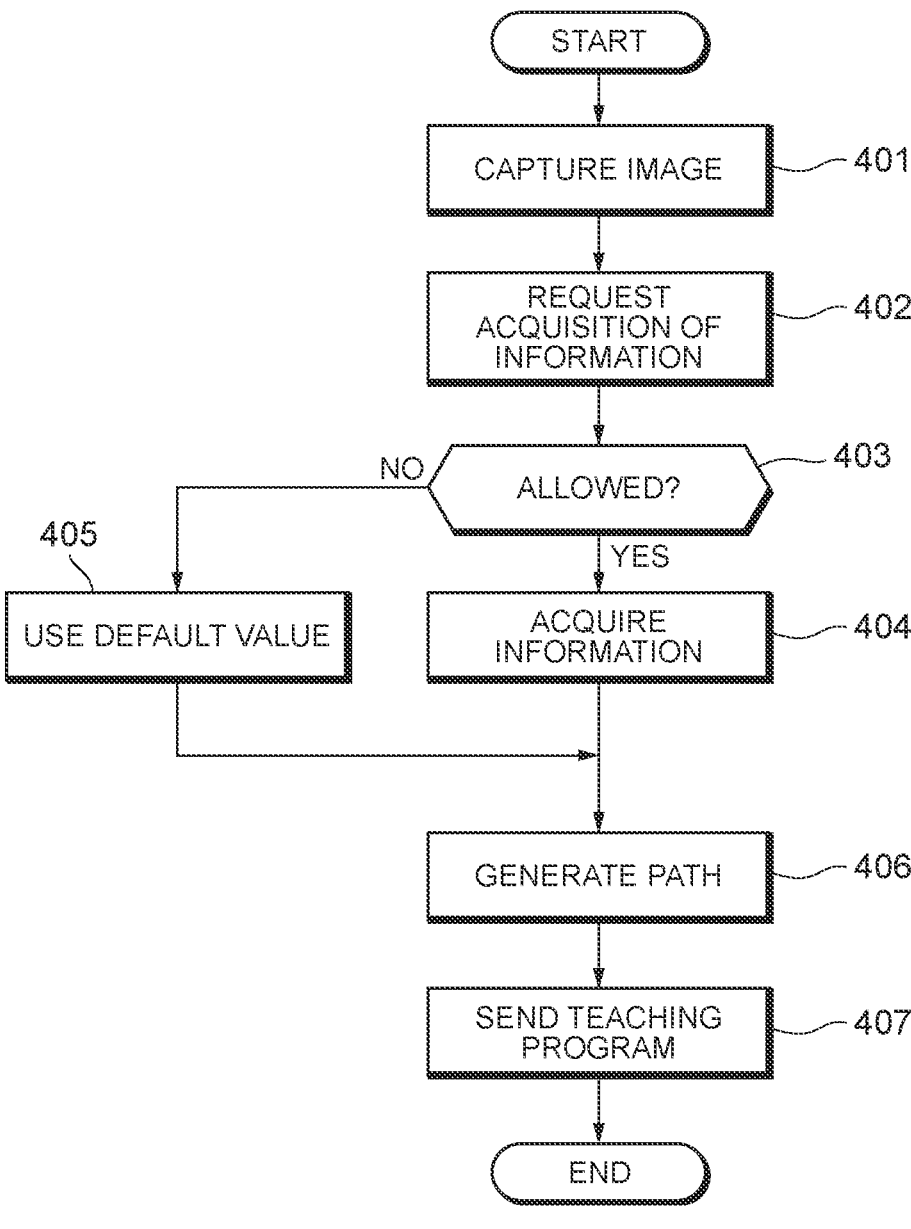
FIG. 4 is a flowchart illustrating the flow of the process of generating a movement path of the robot according to the embodiment of the present invention.

FIG. 4 is a flowchart illustrating the flow of the process for generating a movement path of the robot 3.

The operator operates the terminal device 1 and captures an image using the imaging unit 14 (step 401). The control unit 11 of the terminal device 1 establishes a three-dimensional user coordinate system based on the marker M included in the image captured by the imaging unit 14, and assigns coordinates of the user coordinate system to the point cloud data, which is obtained by the distance measurement unit 15 that measures distances to objects included in the image captured by the imaging unit 14.

The control unit 11 of the terminal device 1 sends a request to the robot controller 2 to acquire the information (a) to (d) listed above from the robot controller 2 (step 402).

If the request is approved by the robot controller 2 (step 403: YES), the control unit 11 of the terminal device 1 acquires the information (a) to (d) listed above from the robot controller 2 (step 404).

If the request is not approved by the robot controller 2 (step 403: NO), the control unit 11 of the terminal device 1 reads out information preset as default values of the information (a) to (d) listed above from the memory unit 12 (step 405).

Using the information (a) to (d) acquired at step 404 or the default value read out from the memory unit 12 at step 405, the control unit 11 of the terminal device 1 computes the robot region corresponding to the robot 3 and tool 31 in the user coordinate system, and generates a path for the robot 3 to move without the robot region interfering with the point cloud data of objects that are present in the surroundings. The control unit 11 of the terminal device 1 converts the movement path of the robot 3 in the user coordinate system into a movement path of the robot 3 in the robot coordinate system, and generates a teaching program to teach the robot 3 the predetermined action (step 406).

The control unit 11 of the terminal device 1 sends the teaching program to the robot controller 2 (step 407).

According to the embodiment of the present invention, the information (b) and (c) mentioned above is used for the generation of a path for the robot 3 with an attached tool 31 to perform a certain action while avoiding interference. Therefore, when the tool 31 on the robot 3 is replaced with another, it is possible to take into consideration the shape, size, or inertia of the tool 31, which differ from tool 31 to tool 31, in generating a path for the robot 3 to perform the action without interference.

According to the embodiment of the present invention, the information (d) mentioned above is used for the genera-tion of a path for the robot 3 to perform a certain action while avoiding interference. Therefore, it is possible to take into consideration the accurate information of the initial orien-tation or initial position of the robot 3 when the robot 3 starts the specified action, in generating a path for the robot 3 to perform the action without interference.

According to the embodiment of the present invention, when the robot 3 or the tool 31 is replaced with another, a three-dimensional model corresponding to the type of the robot 3 or the tool 31 after the replacement is displayed, so that the operator can visually recognize that the robot 3 or tool 31 has been replaced.

The embodiment described above is given for facilitating the understanding of the present invention and not for limiting the interpretation of the present invention. The present invention can be altered or improved without depart-ing from the scope of its subject matter, and includes its equivalents. Namely, any design changes made to the embodiment as appropriate by those skilled in the art are also included in the scope of the present invention as long as the features of the present invention are entailed. Various elements in the embodiment can be combined as long as technically possible, and these combinations are also included in the scope of the present invention as long as they entail the features of the present invention.

What is claimed is:

1. A portable terminal comprising:

a camera configured to capture an image of a robot, to which a marker is attached, and surroundings of the robot;

a processor configured to:

acquire, from a robot controller that controls driving of the robot, information indicating a type of the robot and information indicating a type of a tool replace-ably attached to the robot;

based on the image captured by the camera, the infor-mation indicating the type of the robot, and the information indicating the type of the tool replaceably attached to the robot, calculate positional rela-tionships, on a three-dimensional coordinate system that is based on the marker, between the robot and one or more objects present in the surroundings of the robot; and based on a result of the calculation, generate a program that causes the robot to perform a predetermined action to avoid interference between the robot and the one or more objects;

a communication interface configured to send the pro-gram to the robot controller;

a recording medium that stores respective three-dimen-sional models of multiple types of robots and respective three-dimensional models of multiple types of tools that can be replaceably attached to the robot; and a display configured to:

read out, from the recording medium, a three-dimen-sional model of the robot, based on the type of the robot, and a three-dimensional model of the tool based on the type of the tool; and display the three-dimensional model of the robot and the three-dimensional model of the tool that are read out, wherein the display is configured to change, based on the infor-mation indicating the type of the robot and the infor-mation indicating the type of the tool replaceably attached to the robot, a graphical user interface that allows input of one or more operation instructions from an operator to make the robot execute the predeter-mined action.

2. The portable terminal according to claim 1, wherein the information indicating the type of the tool replaceably attached to the robot includes information about one or more of a shape, a size, and an inertia of the tool replaceably attached to the robot.

3. The portable terminal according to claim 1, wherein the processor is further configured to acquire information about at least one of an orientation and a position of the robot when the robot starts the predetermined action.

* * * * *